W. B. THOMAS.
Spring-Vehicle.
No. 226,371.                    Patented April 6, 1880.
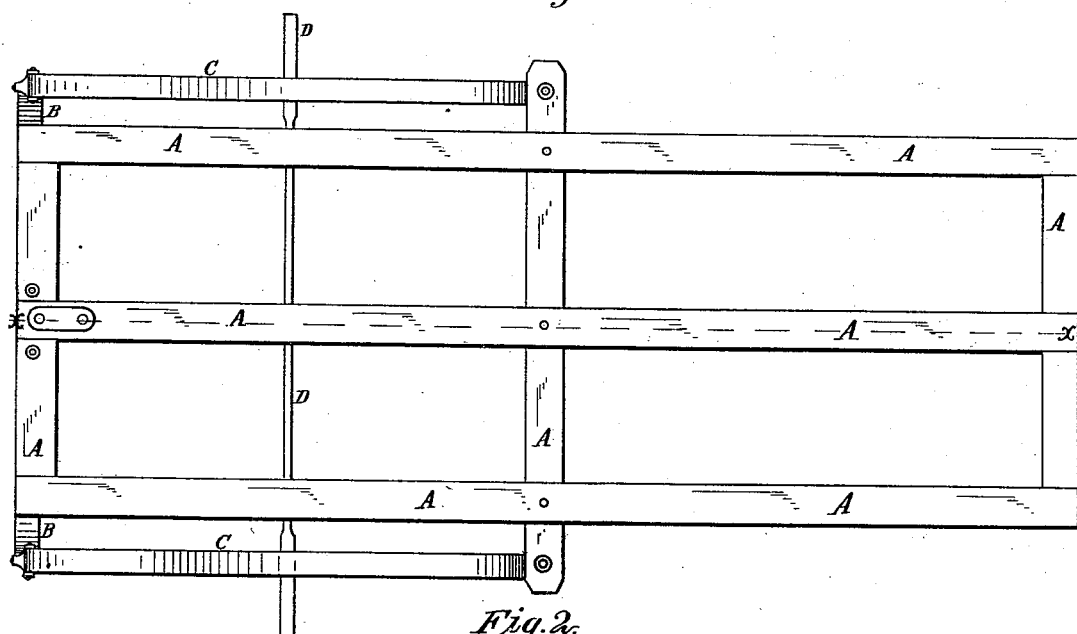
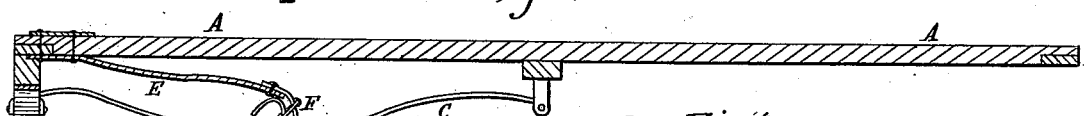
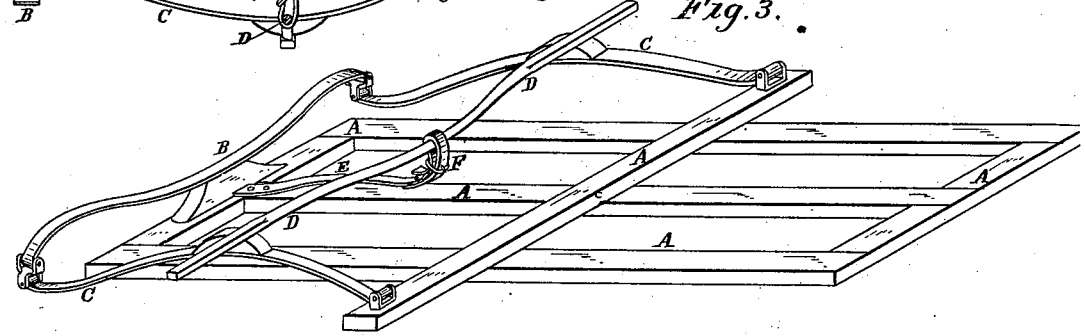
WITNESSES:                      INVENTOR:

UNITED STATES PATENT OFFICE.

WILLIAM B. THOMAS, OF ELMIRA, NEW YORK.

SPRING-VEHICLE.

SPECIFICATION forming part of Letters Patent No. 226,371, dated April 6, 1880.

Application filed February 28, 1880.

*To all whom it may concern:*

Be it known that I, WILLIAM B. THOMAS, of Elmira, Chemung county, and State of New York, have invented a new and useful Improvement in Spring-Wagons, of which the following is a specification.

Figure 1 is a plan view of a vehicle having the improvement. Fig. 2 is a sectional side elevation taken through line $x\,x$, Fig. 1; and Fig. 3 is a perspective view of the improvement inverted.

Similar letters of reference indicate corresponding parts.

The object of this invention is to keep the back springs of a spring-wagon under a slight strain when there is no load in the rear part of the wagon, to prevent the rattling and undue wear of the spring-joints, and to cause the wagon to ride easier.

The invention consists in the combination, with the body and the rear axle of a wagon, of a spring whereby the back spring will be put under a slight strain, as will be hereinafter fully described.

A represents the body-frame of a wagon, B is the rear spring, C are the side springs, and D is the axle, all of which parts are constructed in the usual manner.

To the rear middle part of the body-frame A is attached the end of a spring, E, which projects forward until its forward end is over, or nearly over, the axle D.

To the forward end of the spring E is attached a strap, F, which is passed around the axle D, so that when the rear end of the wagon is without a load the spring E may put the rear springs under sufficient strain to prevent their joints from rattling and having undue wear, and to cause the wagon to ride easier than it otherwise would.

The spring E may be connected directly with the axle D, if desired, and may be made of metal or rubber.

The spring E may be variously arranged— as, for instance, it may be placed across the wagon-body, or in any other position where it will produce the effect of putting the rear springs under a slight tension when the rear end of the wagon is without a load.

The spring E also prevents the wagon-springs from being broken by the upward throw in passing over uneven ground.

A spiral spring, or more than one spring, may be used, if desired.

Having thus described my invention, I claim as new and desire to secure by Letters Patent—

In spring-wagons, the combination, with the body A and the axle D, of a spring, E, substantially as herein shown and described, whereby the rear springs will be put under a slight strain when the rear end of the wagon is without a load, as set forth.

WILLIAM BANKS THOMAS.

Witnesses:
F. M. JACKSON,
WILLIAM S. EVANS.